(12) United States Patent
Rao et al.

(10) Patent No.: US 12,070,884 B2
(45) Date of Patent: Aug. 27, 2024

(54) METHODS OF MAKING UV REFLECTIVE PARTICLES

(71) Applicants: DOW GLOBAL TECHNOLOGIES LLC, Midland, MI (US); ROHM AND HAAS COMPANY, Collegeville, PA (US)

(72) Inventors: Yuanqiao Rao, Collegeville, PA (US); Nikhil J. Fernandes, Collegeville, PA (US); Hyunwoo Kim, Freeport, TX (US); Lei Liu, Freeport, TX (US)

(73) Assignees: DOW Global Technologies LLC, Midland, MI (US); Rohm and Haas Company, Collegeville, PA (US)

(*) Notice: Subject to any disclaimer, the term of this patent is extended or adjusted under 35 U.S.C. 154(b) by 68 days.

(21) Appl. No.: 17/621,083

(22) PCT Filed: Jun. 25, 2020

(86) PCT No.: PCT/US2020/039635
§ 371 (c)(1),
(2) Date: Dec. 20, 2021

(87) PCT Pub. No.: WO2020/264169
PCT Pub. Date: Dec. 30, 2020

(65) Prior Publication Data
US 2022/0355523 A1 Nov. 10, 2022

Related U.S. Application Data

(60) Provisional application No. 62/866,245, filed on Jun. 25, 2019.

(51) Int. Cl.
*B29C 48/00* (2019.01)
*B29B 9/04* (2006.01)
(Continued)

(52) U.S. Cl.
CPC .............. *B29C 48/001* (2019.02); *B29B 9/04* (2013.01); *B29B 9/12* (2013.01); *B29C 48/022* (2019.02);
(Continued)

(58) Field of Classification Search
None
See application file for complete search history.

(56) References Cited

U.S. PATENT DOCUMENTS

| 3,711,176 A | 1/1973 | Alfrey et al. |
| 2001/0011779 A1 | 8/2001 | Stover et al. |

(Continued)

FOREIGN PATENT DOCUMENTS

| EP | 0404463 A2 | 12/1990 |
| EP | 0514223 A1 | 11/1992 |

(Continued)

*Primary Examiner* — Robert J Grun
(74) *Attorney, Agent, or Firm* — Condo Roccia Koptiw LLP

(57) ABSTRACT

Described herein are UV reflective particles, and methods of forming UV reflective particles, comprising extruding a film having a plurality of alternating layers of polycarbonate (PC) and poly(methyl methacrylate) (PMMA), wherein each layer is less than 150 nm thick, and grinding the film into particles having a median particle size less than 200 microns.

20 Claims, 7 Drawing Sheets

(51) Int. Cl.
  *B29B 9/12* (2006.01)
  *B29C 48/07* (2019.01)
  *B29C 48/21* (2019.01)
  *B29C 48/71* (2019.01)
  B29K 33/00 (2006.01)
  B29K 69/00 (2006.01)

(52) U.S. Cl.
  CPC .............. *B29C 48/07* (2019.02); *B29C 48/21* (2019.02); *B29C 48/71* (2019.02); *B29B 2009/125* (2013.01); *B29K 2033/12* (2013.01); *B29K 2069/00* (2013.01)

(56) References Cited

U.S. PATENT DOCUMENTS

2003/0008144 A1* 1/2003 Whitney ................. B32B 27/08
  428/323
2010/0330350 A1 12/2010 Osada et al.

FOREIGN PATENT DOCUMENTS

| EP | 2532702 A1 | 12/2012 |
| WO | WO 94/09392 A1 | 4/1994 |
| WO | WO 94/10589 A1 | 5/1994 |
| WO | WO 2009-096298 A1 | 8/2009 |
| WO | WO 2018-125915 A1 | 7/2018 |

* cited by examiner

METHODS OF MAKING UV REFLECTIVE PARTICLES

CROSS-REFERENCE TO RELATED APPLICATIONS

This application is the National Stage Entry under 35 U.S.C. § 371 of Patent Cooperation Treaty Application No. PCT/US2020/39635, which claims priority to U.S. Provisional Application Ser. No. 62/866,245, filed Jun. 25, 2019, the entire contents of each of which are incorporated by reference herein in their entireties.

BACKGROUND

Ultraviolet (UV) radiation, for example, from the sun, can damage a number of substrates, whether it be skin (e.g., in vivo or as leather), fabric, wood, plastic (e.g., polyethylene, polystyrene, polypropylene, polyvinyl chloride, etc.), coatings, elastomers, etc.

Accordingly, it is important to develop UV reflective particles that can be applied to substrates to mitigate UV transmission to the surface of the substrate.

SUMMARY

Described herein are UV reflective particles and methods of forming UV reflective particles comprising extruding a film having a plurality of alternating layers of polycarbonate (PC) and poly(methyl methacrylate) (PMMA), wherein each layer is less than 150 nm thick, and grinding the film into particles.

DETAILED DESCRIPTION

Figure 1:
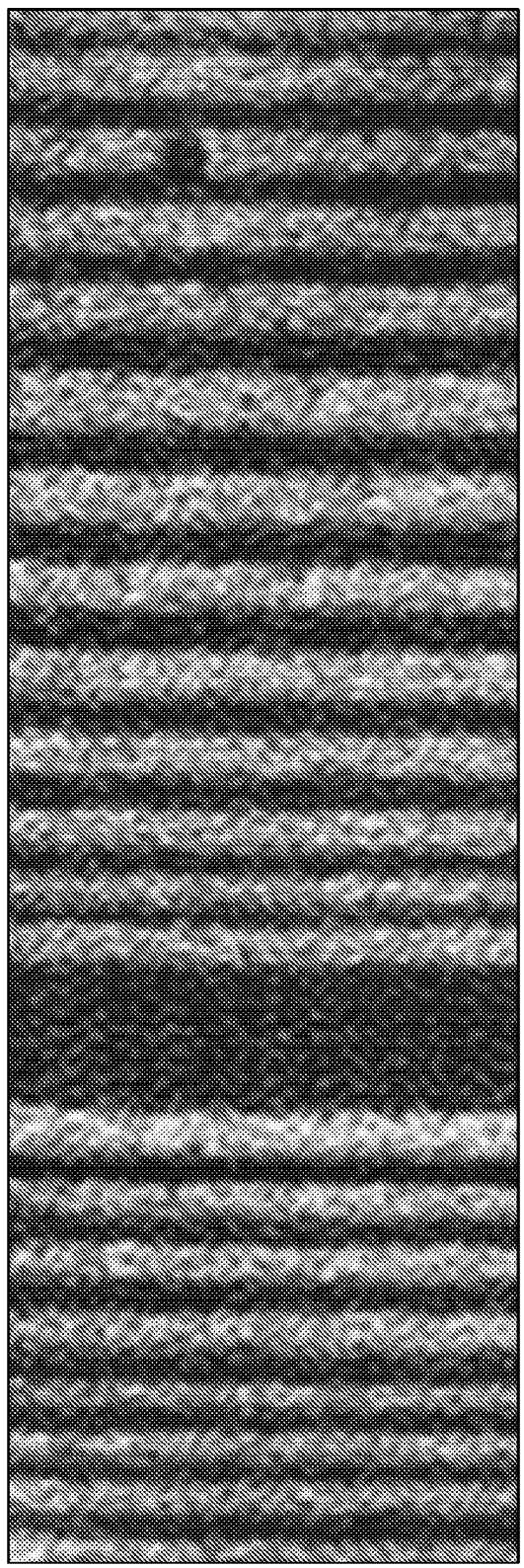
FIG. 1 is an Atomic Force Microscope (AFM) image of a cross section of a UV reflective film.

Described herein are methods of forming UV reflective particles, for example, by grinding a UV reflective film. It is understood that UV reflective can be used synonymously with UV blocking, as the important feature is curtailing UV transmission through the film, or composition containing the particles made from the film, as will be described.

In an embodiment, a UV reflective film may be formed having a series of alternating layers of two polymers with different refractive indexes. The number of two-polymer pair layers (e.g., a layer of a second polymer over a layer of a first polymer) may be greater than about 50, greater than about 100, greater than about 150, greater than about 200, greater than about 300, greater than about 400, and less than about 450, less than about 350, less than about 250, and less than about 220, embracing all combinations and sub-combinations therein. In an embodiment, the number of pair layers may be about 200.

Each individual polymer layer may have a thickness from about 35 nm to about 160 nm, preferably from about 40 nm to about 100 nm, more preferably from about 50 nm to about 90 nm. In an embodiment, each individual polymer layer is less than 150 nm thick. In an embodiment, the layers are fairly uniform in thickness, for example, the variation in thickness of each of the layers (e.g., for a given polymer) may be less than about 50%, preferably less than about 35%. It is understood that consistency in layer thickness throughout the film is desirable. Extrusion process conditions, such as, for example, die gap, flow rate, and temperature, affect the thickness of individual polymer layer.

In an embodiment, one of the polymers is polycarbonate (PC). Commercially available polycarbonate resins include, for example, CALIBRE™ 200-14 polycarbonate resin (commercially available from Trinseo LLC, Berwyn, PA), a natural polycarbonate resin with a melt flow index (MFI) of 14 dg/min (300° C./1.2 kg), and CALIBRE™ 302-10 polycarbonate resin (commercially available from Trinseo LLC, Berwyn, PA), a polycarbonate resin with an MFI of 10 dg/min (300° C./1.2 kg).

In an embodiment, one of the polymers is an (meth) acrylic polymer. In an embodiment, one of the polymers is poly(methyl methacrylate) (PMMA). Commercially available PMMA resins include, for example, PLEXIGLAS™ V045-100 acrylic resin (commercially available from Arkema, Inc., King of Prussia, PA), a poly(methyl methacrylate) resin with a MFI of 2.3 dg/min (230° C./3.8 kg), and PLEXIGLAS™ V825 acrylic resin (commercially available from Arkema, Inc., King of Prussia, PA), a poly (methyl methacrylate) resin with a MFI of 3.7 dg/min (230° C./3.8 kg).

In an embodiment, the alternating layers form a core structure of alternating layers of different refractive indexes (e.g., a core structure of alternating layers of polycarbonate and PMMA). The core structure may be covered with at least one skin layer. The core structure may be sandwiched between two skin layers. In an embodiment, the skin layer may comprise one or more of the polymers selected from those comprising the alternating layers. In an embodiment, the skin layer may comprise an (meth)acrylic polymer. In an embodiment, the skin layer may comprise PMMA. In an embodiment, the skin layer may comprise a polymer that is neither of the polymers comprising the alternating layers (e.g., a third polymer). In an embodiment, the skin layer may comprise a polymer with a different refractive index from either of the polymers comprising the alternating layers.

The skin layer(s) may be thicker than a two-polymer pair layer of alternating polymers. In an embodiment, the thickness of the skin layers (e.g., both together) compared to the thickness of the total film may be greater than about 5%, greater than about 7%, greater than about 10%, and less than about 50%, less than about 20%, and less than about 12%, embracing all combinations and sub-combinations therein. For example, if the total film (e.g., core structure plus skin layers) thickness is less than 100 microns, in an embodiment, the skin layers may be less than about 10 microns.

To create the film, the alternating layers may be formed by coextruding a PC resin feed from a first extruder and a PMMA resin feed from a second extruder through a feed-block and/or a multiplier. The use of a multiplier allows the desired number of layers to be generated. In an embodiment, the coextrusion via feedblock and multiplier is used to form at least 50 alternating liquid resin pair layers (e.g., a total of 100 individual polymer layers). The number of two-polymer pair layers may be greater than about 50, greater than about 100, greater than about 150, greater than about 200, greater than about 300, greater than about 400, and less than about 450, less than about 350, less than about 250, and less than about 220, embracing all combinations and sub-combinations therein. In an embodiment, the coextrusion via feedblock and multiplier is used to form about 102 alternating liquid resin pair layers (e.g., a total of about 205 individual polymer layers). The alternating layers may be cast on a chill roll.

The term "median particle size" as used herein and in the appended claims is the D50 value determined in accordance with ASTM B 822-17.

The UV reflective particles may be formed by forming a UV reflective film as described herein and then grinding the film. For example, a film may be cut into pieces (for example, having a size less than 5 mm). A high-speed dry rotor-stator mill may be used to grind the film pieces into particles. In an embodiment, the film is ground into particles until the particles pass through a sieve with trapezoidal holes of 0.5 mm (preferably, 0.25 mm; more preferably, 0.20 mm; still more preferably, 0.12 mm; most preferably, 0.08 mm). In an embodiment, the film is ground until the particles have a median particle size less than 200 microns. In an embodiment, the film is ground until the particles have a median particle size of about 120 microns. It is understood that grinding can be used to achieve a variety of desired median particle sizes that still fall within this description.

In an embodiment, the UV reflective particles are ground until the median particle size is less than 100 microns. An aspect ratio of a particle refers to its shortest three-dimensional axis versus its longest three-dimensional axis (for example, thickness versus length). In this definition of aspect ratio, the orientation of layers within the particle (e.g., grain) are irrelevant to determining which axis is the shortest and longest. Accordingly, aspect ratios of the UV reflective particles may vary from an aspect ratio of 1 to about 1 (e.g., when finely ground) to an aspect ratio of 1 to about 100. In an embodiment, the UV reflective particles have an aspect ratio of about 1 to about 10, about 1 to about 8, about 1 to about 5, about 1 to about 4, about 1 to about 3, about 1 to about 2, and/or about 1 to about 1.5. In an embodiment, the UV reflective particle shape has an aspect ratio that is greater than an aspect ratio of about 1 to about 2. In an embodiment, the UV reflective particle shape has an aspect ratio of about 1 to about 5. Without being bound by theory, it is believed that a relatively larger aspect ratio is desirable for UV blocking.

In use, the UV reflective particles may be incorporated into compositions for protecting a substrate from UV radiation. Examples of such compositions to prevent or minimize UV damage to a substrate include, for example, sun care compositions (including sunscreens, moisturizers, lip balms, etc.), leather care compositions, fabric care compositions (e.g., anti-fade compositions), wood protection compositions (including varnishes, stains, sealers, etc.), plastic (e.g., polyethylene, polystyrene, polypropylene, polyvinyl chloride, etc.) protection compositions, coatings, and/or elastomer protection compositions.

In an embodiment, UV reflective particles are incorporated into coatings, for example architectural coatings (including, for example, paints, roofing coatings, deck finishes, etc.). In an embodiment, UV reflective particles are incorporated into elastomers, for example, to prevent or minimize UV damage.

In an embodiment, the foregoing compositions contain greater than about 1%, greater than about 3%, greater than about 5%, and less than about 20%, less than about 15%, and less than about 12%, UV reflective particles by weight of the composition. In an embodiment, the UV reflective particles block a portion of at least one of UVA radiation and/or UVB radiation. In an embodiment, the UV reflective particles are highly transparent in the visible light range, for example to avoid imparting a whitening effect on a substrate.

The following examples are for illustrative purposes only and are not intended to limit the scope of the appended claims.

EXAMPLES

Example 1

A first 31.75 mm (1.25 inch) diameter, 24:1 L/D single screw extruder was loaded with a polycarbonate resin. The polycarbonate resin was dried in a drier at 120° C. overnight to reduce the moisture content before processing.

A second 31.75 mm (1.25 inch) diameter, 24:1 L/D single screw extruder was loaded with a poly(methyl methacrylate) (PMMA) resin. The PMMA resin was dried in a drier at 80° C. overnight to reduce the moisture content before processing.

The first extruder and second extruder were arranged to form a coextrusion line used for a microlayer extrusion. A sequential feedblock and layer multipliers were used to produce layered coextruded structures with about 102 alternating liquid resin pair layers (e.g., a total of about 205 individual polymer layers).

The coextruded structures were merged with skin layers comprising PMMA resin extruded at 20 lb/h from an 8-inch wide film die to create 12-50-micron thick films. Extruder and die temperatures were set at 243° C. The extruders fed individual gear pumps to ensure uniform flow of the polymer melts to the feedblock and dies. Extruded films were cooled down on a chill roll set at 104° C. The resulting UV reflective films had alternating layers of polycarbonate and poly(methyl methacrylate).

Film 1 comprised a core structure of CALIBRE™ 200-14 polycarbonate resin and PLEXIGLAS™ V045-100 acrylic resin (e.g., PMMA) alternating layers, with PMMA skin layers (also of PLEXIGLAS™ V045-100 acrylic resin) on either side of the core structure. The extrusion process conditions, such as, for example, die gap, flow rate, and temperature, were controlled to generate a film where the thickness of individual polymer layer was about 60 nm.

Film 2 comprised a core structure of CALIBRE™ 200-14 polycarbonate resin and PLEXIGLAS™ V825-100 acrylic resin (e.g., PMMA) alternating layers, with PMMA skin layers (also of PLEXIGLAS™ V825-100 acrylic resin) on either side of the core structure. The extrusion process conditions, such as, for example, die gap, flow rate, and temperature, were controlled to generate a film where the thickness of individual polymer layer was about 67 nm.

Example 2 (Comparative)

A comparative Film A was prepared. A 31.75 mm (1.25 inch) diameter, 24:1 L/D single screw extruder was loaded with CALIBRE™ 200-14 polycarbonate resin and was extruded as a comparative, single refractive index, film. The resulting film was a single-polymer (e.g., polycarbonate)

film with a thickness of about 25 micron. Comparative Film A did not have multiple layers.

Example 3

Film 1 (described in Example 1) was prepared substantially according to Example 1 and characterized as follows using an Atomic Force Microscope (AFM). Cross-sectioned multilayer film samples were prepared by punching specimens out of samples and mounting them in vise holders. Samples were milled flat with a cryo-mill at ~−80° C. The samples were then polished with cryomicrotomy at −80° C. The block faces were examined. Peak force tapping AFM images were obtained on a BRUKER ICON™ atomic force microscope using a NANOSCOPE V™ controller (software v 8.15). NANOWORLD ARROW NCR™ cantilevers were used with the following settings: PF setpoint of 0.045, scan assist auto gain on, PF amplitude of 300, DMT mod limit of 4, Z range of 4, and PF engagement setpoint of 0.1. All images were captured at 1024 lines of resolution and produced with SPIP version 6.4.2. software. A second order average plane fit was used, with a zero order LMS and the mean set to zero. Layer measurements were performed using an IMAGEJ™ Java image processing and analysis program.

The total thickness of Film 1 was determined to be 25 microns. Film 1 contained a 102-layer pair core that was about 12 microns thick. The layers varied in individual thickness, the variation being is 59+/−18 nm. This demonstrated satisfactory control of the layer thickness, as the nominal thickness of the individual layers was designed to be 60 nm. FIG. 1 is an AFM image of a cross section of Film 1. As can be seen in FIG. 1, Film 1 has a series of alternating layers of different refractive indexes (e.g., alternating layers of polycarbonate and PMMA).

Example 4

UV-Vis spectroscopy was undertaken on a Film 1 (described in Example 1) prepared substantially according to Example 1. Diffuse transmission spectra were acquired with a PERKINELMER LAMBDA 950™ UV-Vis-NIR spectrometer and a 60 mm integrating sphere accessory at a resolution (slit width) of 2 nm and data interval of 2 nm. The detector response time was 0.2 sec. Approximately eighty reflection and transmission data were collected.

Figure 2:
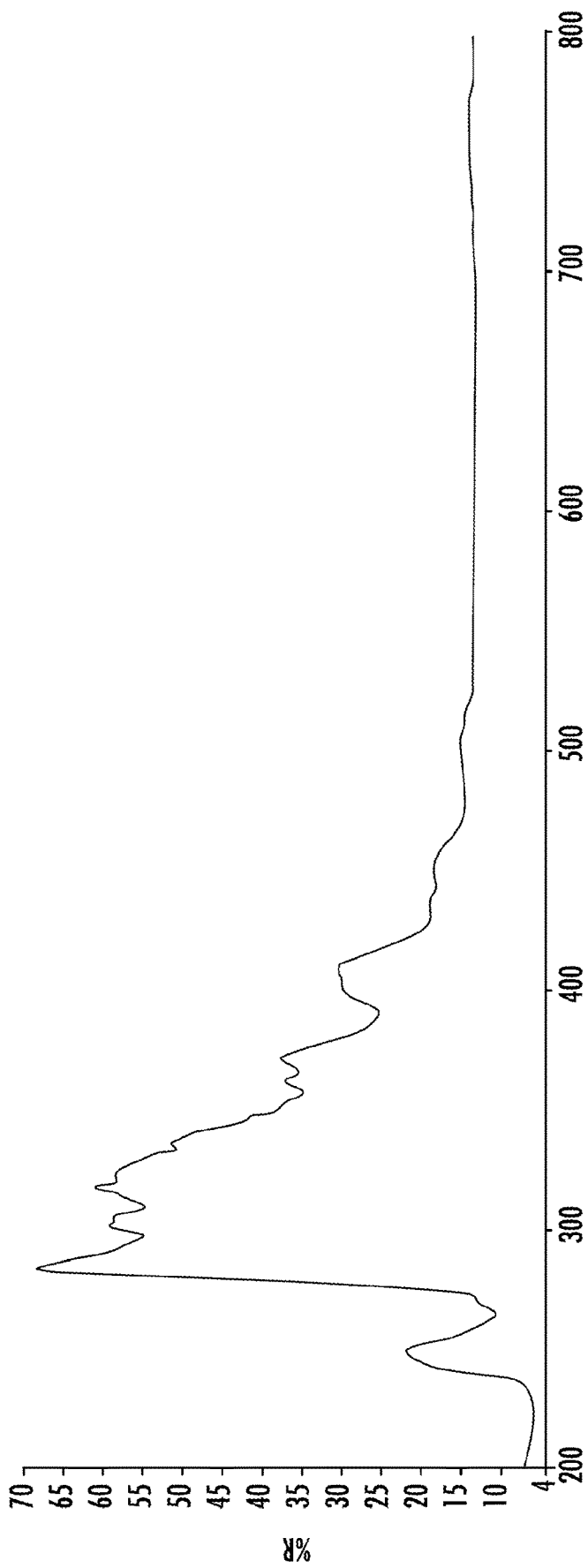
FIG. 2 is a UV-Vis reflection spectrum of the UV reflective film.

FIG. 2 is a UV-Vis reflection spectrum of the UV reflective film. FIG. 2 shows that Film 1 has strong UV reflection in the range of 290 to 400 nm, while very low reflection in the visible range (<15% reflection between 450 nm and 800 nm). Accordingly, Film 1 is highly transparent in the visible range (~90% transmission at 550 nm), which is desirable aesthetically.

Figure 3:
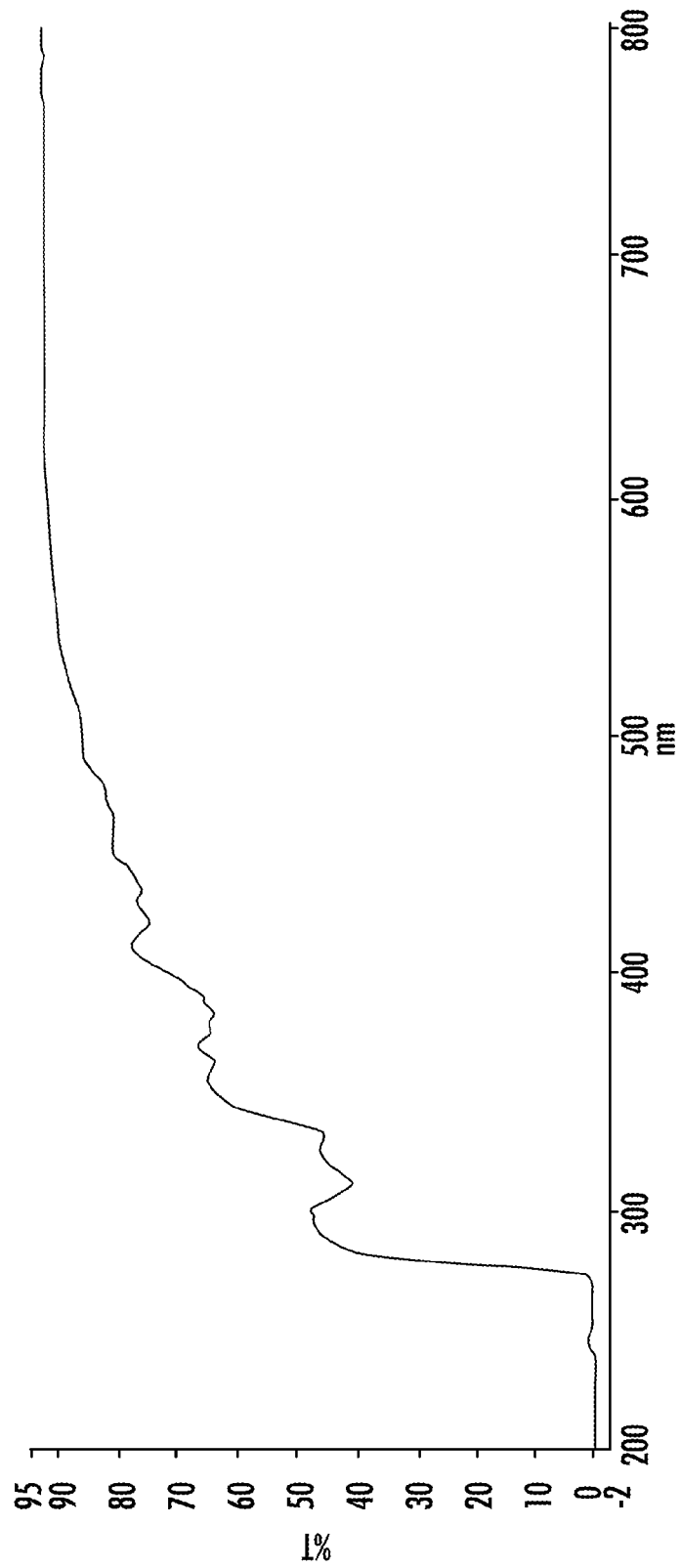
FIG. 3 is a UV-Vis transmission spectrum of the UV reflective film.

FIG. 3 is a UV-Vs transmission spectrum of the UV reflective film. Transmission between approximately 290 nm and 400 nm qualify the performance of UV blocking. As shown in FIG. 3, Film 1 exhibits a strong UV blocking effect.

Figure 4:
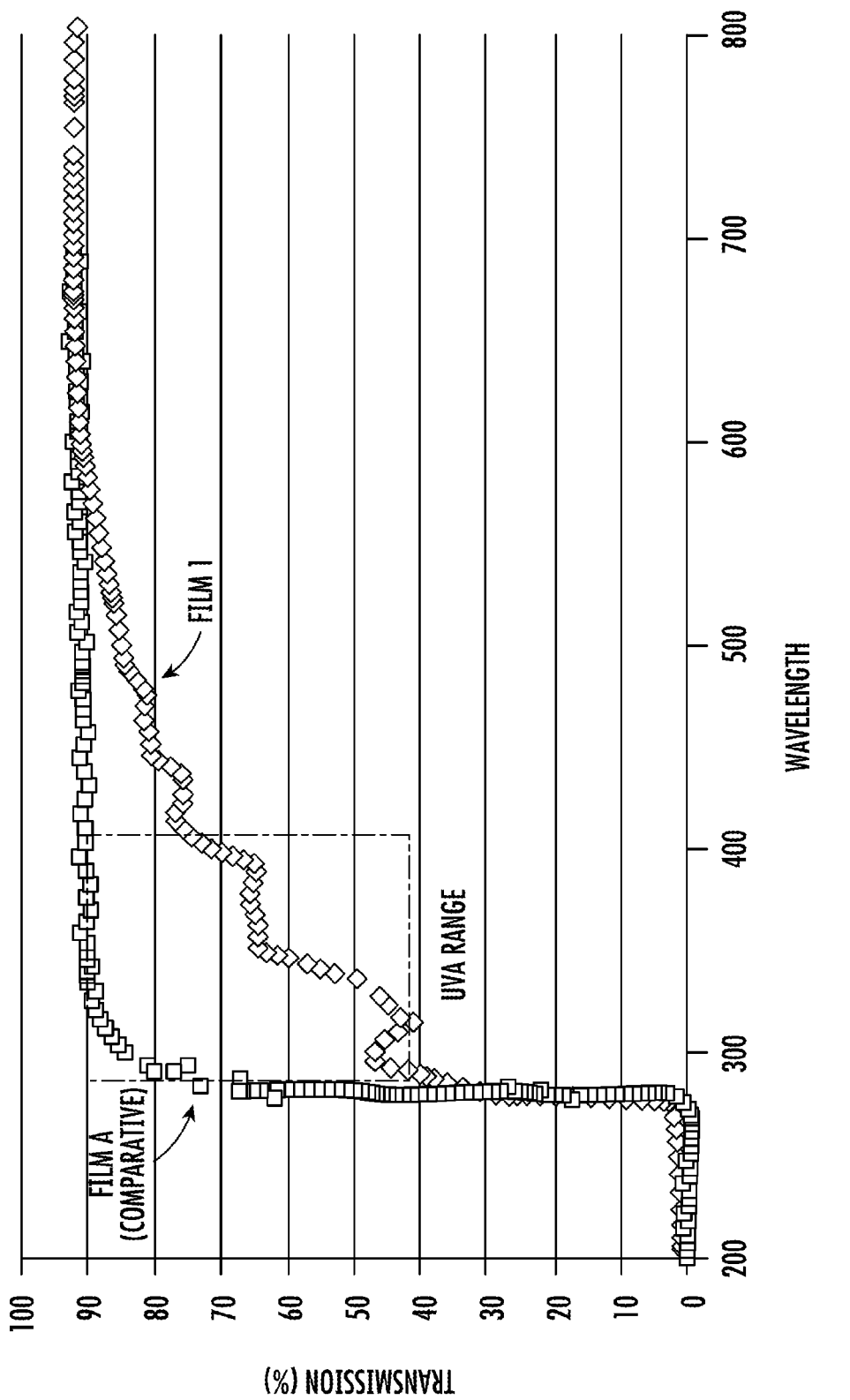
FIG. 4 is a UV-Vis transmission spectrum of the UV reflective film and a comparative polycarbonate film.

A comparative Film A was prepared substantially according to Example 2 and subjected to UV-Vs spectroscopy. FIG. 4 is a UV-Vis transmission spectrum of Film 1 and comparative Film A. As shown in FIG. 4, comparative Film A does not block transmission in the UV spectrum (e.g., the transmission is above 85% in the UV range (290 nm to 400 nm)). In contrast, Film 1 exhibits a strong UV blocking effect.

Example 5

Film 2 (described in Example 1) was prepared substantially according to Example 1, except that nominal thickness of each individual layer was designed to be 67 nm with a 104-layer pair core. The thickness of the Film 2 was about 28 micron. Film 2 was characterized as follows using a UV-Vis reflection spectrum. Diffuse transmission spectra were acquired with a PERKINELMER LAMBDA 950™ UV-Vis-NIR spectrometer and a 60 mm integrating sphere accessory at a resolution (slit width) of 2 nm and data interval of 2 nm. The detector response time was 0.2 sec. Approximately 80 reflection data were collected.

Figure 5:
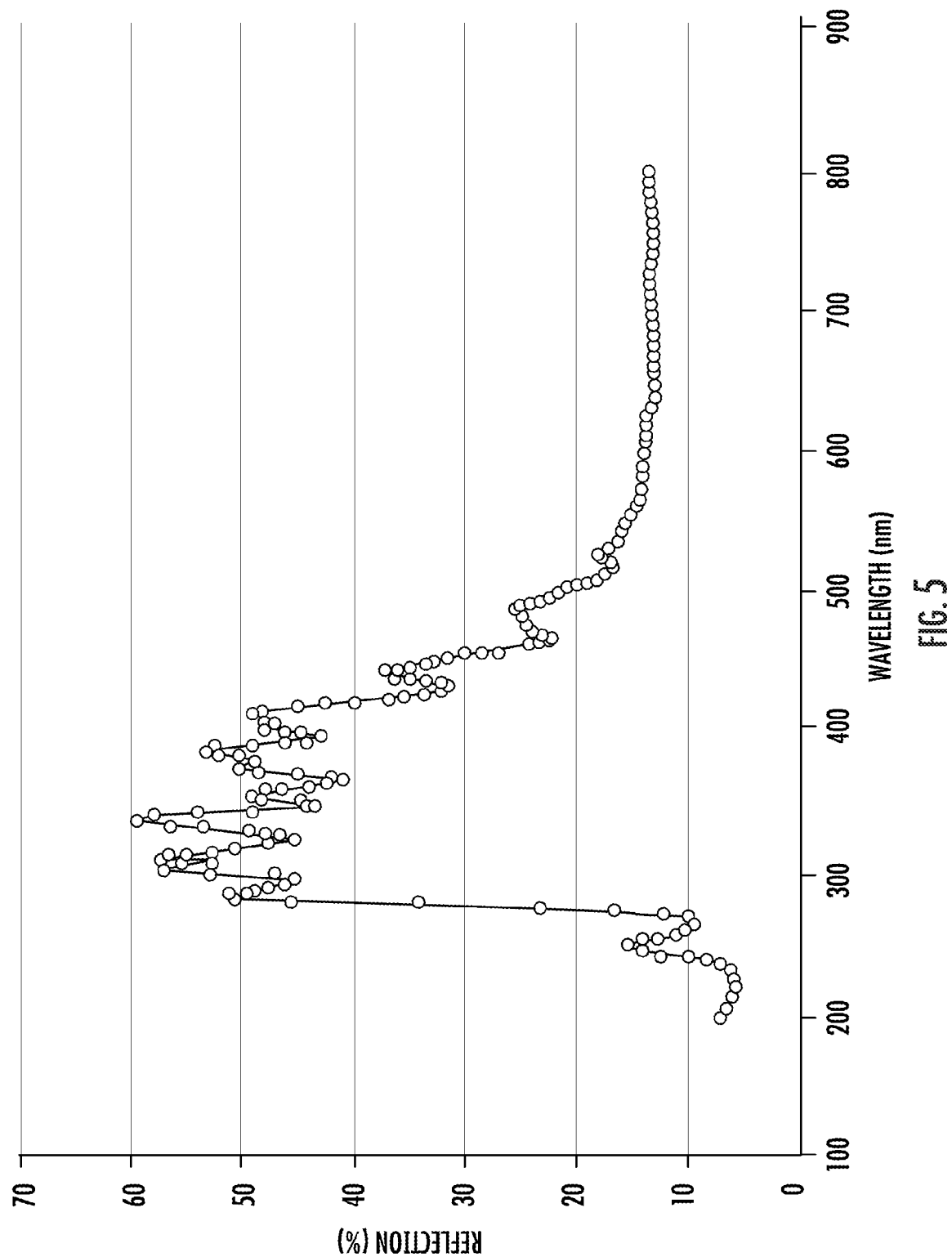
FIG. 5 is a UV-Vis reflection spectrum of another UV reflective film.

FIG. 5 is a UV-Vis reflection spectrum of Film 2. As shown, Film 2 exhibits a broad and stable UV reflection in the range of 290 to 400 nm (an average of 50%). The breadth of the UV reflection is advantageous in blocking broad solar UV radiation.

To fabricate UV reflective particles, Film 2 was cut into pieces of a size less than 5 mm. A RETSCH ZM 200™ high-speed dry rotor-stator mill was used to further reduce the pieces into UV interference particles. Both dry ice and liquid nitrogen were used as the grinding media. The grinding speed was set between 6000 rpm-18000 rpm and the screen sizes with trapezoidal holes of 2000, 1000, 500, 120 and 80 microns were used, resulting in a film powder comprising UV reflective particles.

Figure 6:
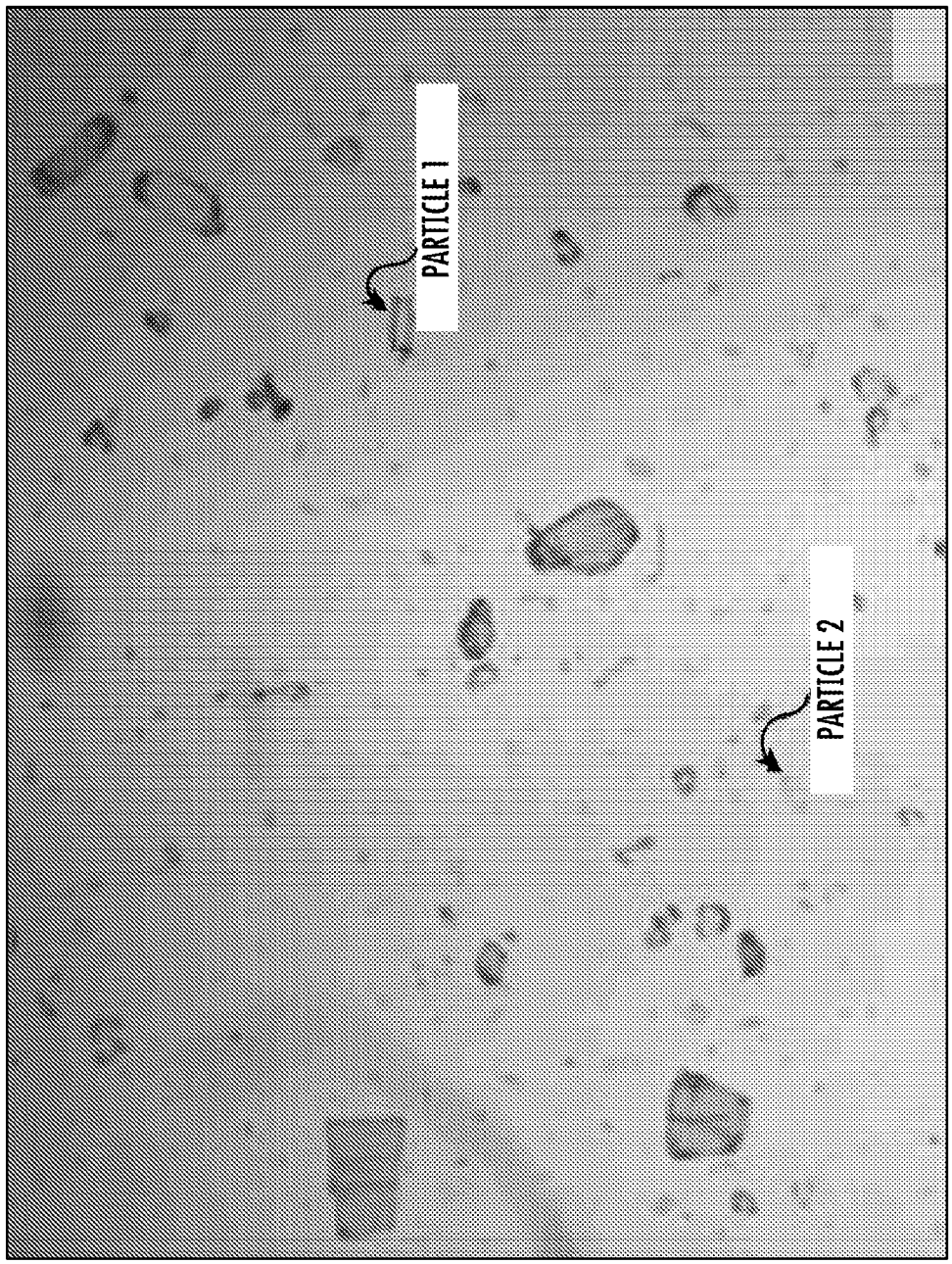
FIG. 6 is an optical micrograph of UV reflective particles produced from the UV reflective film of FIG. 5.

After forming the UV reflective particles, the particles were added in deionized (DI) water. A drop of MICRO-90™ cleaning solution containing a surfactant was added to the particle and water mixture to wet the film powder. The mixture was then sonicated for 5 min, then it was stirred on a stir plate. While stirring, the mixture was pipetted into a BECKMAN COULTER LS 13 320™ laser diffraction particle size analyzer to determine particle size measurement. Fraunhofer diffraction was used to calculate the particle size. A median particle size (D22) of 122 microns was measured using the particle sizer. Smaller particles could be produced similarly if desired. FIG. 6 is an optical micrograph of the particles produced from Film 2. FIG. 6 illustrates successful formation of small individual particles. Particle 1 was about 170 microns.

Particle 2 was about 71 microns.

Example 6

To ascertain the UV blocking efficiency of UV reflective particles, UV reflective particles were formed substantially as described in Example 5.

These UV reflective particles were added a NIVEA™ daily moisture body lotion via speed mixer at a loading of 10% to create a sun care composition.

Untreated NIVEA™ daily moisture body lotion was used as a control sample.

Figure 7:
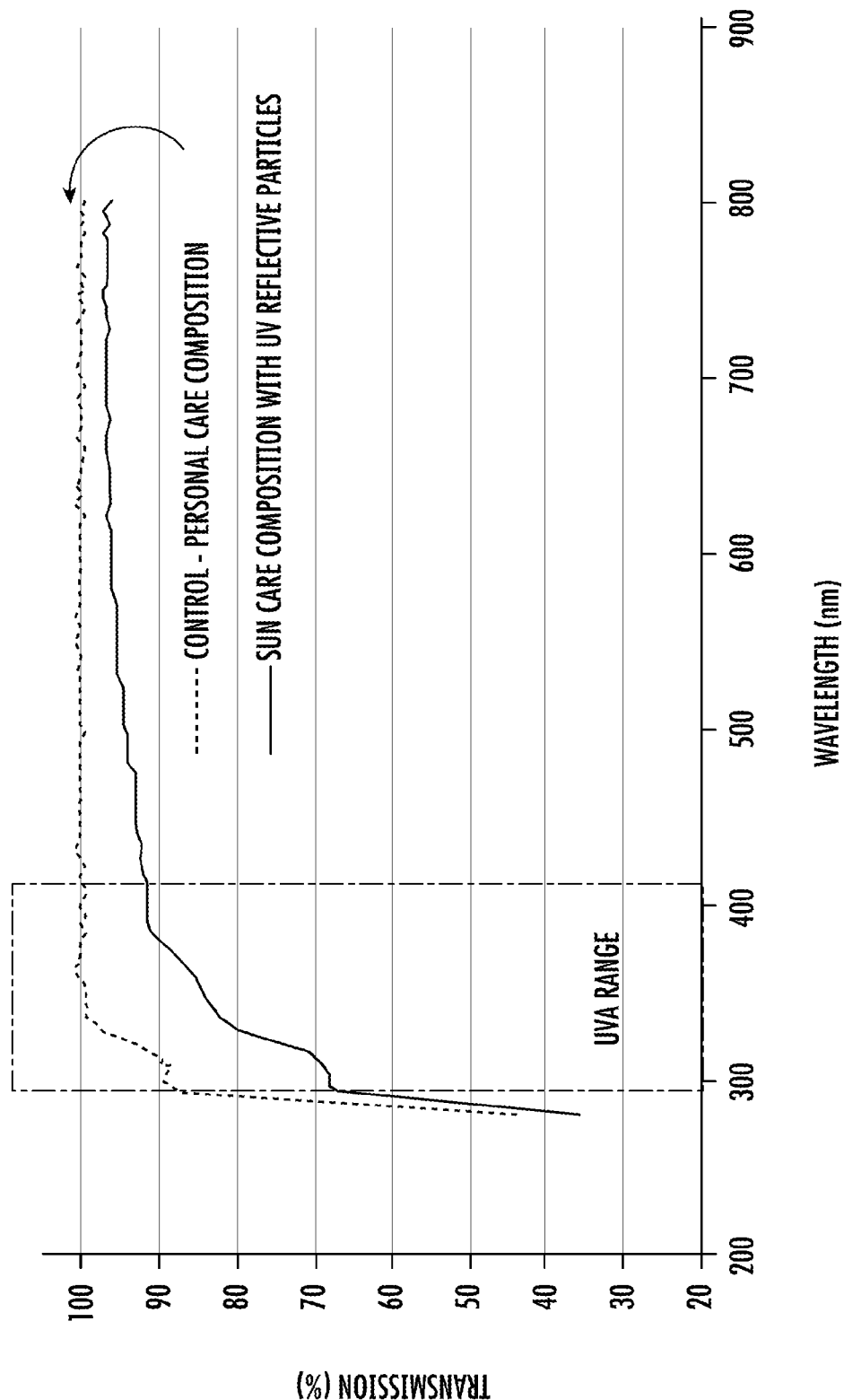
FIG. 7 is a UV-Vis transmission spectrum of a sun care composition incorporating UV reflective particles produced from the UV reflective film of FIG. 5 and a control personal care composition.

FIG. 7 is a UV-Vis transmission spectrum of the sun care composition and the control personal care composition.

As shown in FIG. 7, the sun care composition shows significantly lower transmission in the UV range (from 290 nm to 400 nm) as compared to the control sample. The sun care composition shows high transmission in the visible range (450 nm to 800 nm), which indicates desirable aesthetics on skin surface. Accordingly, a sun care composition containing UV reflective particles described herein would act to block harmful rays in the UV range.

It is understood that this disclosure is not limited to the embodiments specifically disclosed and exemplified herein. Various modifications of the invention will be apparent to those skilled in the art. Such changes and modifications may be made without departing from the scope of the appended claims. Moreover, each recited range includes all combinations and sub-combinations of ranges, as well as specific numerals contained therein.

The invention claimed is:

1. A method of forming a UV reflective particle, comprising:
   extruding a film having a plurality of alternating layers of polycarbonate (PC) and poly(methyl methacrylate) (PMMA), wherein each of the individual polymer layers has a thickness from about 50 nm to about 90 nm; and
   grinding the film into particles.

2. The method of claim 1, wherein the extruding further comprises coextruding a PC resin feed from a first extruder and a PMMA resin feed from a second extruder through a feedblock.

3. The method of claim 1, wherein the extruding further comprises coextruding through a multiplier.

4. The method of claim 2, wherein the extruding further comprises forming at least 50 alternating liquid resin pair layers.

5. The method of claim 1, wherein the variation in thickness of each of the individual polymer layers is less than about 50%.

6. The method of claim 1, further comprising casting the plurality of alternating layers on a chill roll.

7. The method of claim 1, further comprising covering the plurality of alternating layers with at least one skin layer.

8. The method of claim 7, wherein the at least one skin layer is about 10% of the film by volume.

9. The method of claim 1, wherein the particles have a median particle size of about 120 microns.

10. The method of claim 2, wherein the extruding further comprises coextruding through a multiplier.

11. A method of forming a UV reflective particle, comprising:
    extruding a film having a plurality of alternating layers of polycarbonate (PC) and poly(methyl methacrylate) (PMMA), wherein each layer is less than 150 nm thick;
    covering the plurality of alternating layers with at least one skin layer; and
    grinding the film into particles.

12. The method of claim 11, wherein each of the individual polymer layers has a thickness from about 50 nm to about 90 nm.

13. The method of claim 11, wherein the variation in thickness of each individual layer of the alternating layers is less than about 50%.

14. The method of claim 11, wherein the particles have a median particle size less than 200 microns and an aspect ratio greater than about 1 to about 2.

15. The method of claim 11, wherein the at least one skin layer is about 10% of the film by volume.

16. A method of forming a UV reflective particle, comprising:
    extruding a film having a plurality of alternating layers of polycarbonate (PC) and poly(methyl methacrylate) (PMMA), wherein each individual layer is less than 150 nm thick, and wherein the variation in thickness of each individual layer of the alternating layers is less than about 50%;
    covering the alternating layers with at least one skin layer; and
    grinding the film into particles;
    wherein the particles have a median particle size less than 200 microns and an aspect ratio greater than about 1 to about 2.

17. The method of claim 16, wherein the particles have an aspect ratio of about 1 to about 5.

18. The method of claim 16, wherein the particles have a median particle size of less than about 100 microns.

19. The method of claim 16, wherein the particles block a portion of at least one of UVA radiation and/or UVB radiation.

20. The method of claim 16, wherein the particles are highly transparent in the visible light range.

* * * * *